United States Patent Office 3,450,709
Patented June 17, 1969

3,450,709
PROCESS FOR THE PREPARATION OF RING-SUBSTITUTED 2-AMINOIMIDAZOLES
Giancarlo Lancini, Pavia, and Ettore Lazzari, Milan, Italy, assignors to Lepetit S.p.A., Milan, Italy
No Drawing. Filed Mar. 28, 1966, Ser. No. 537,683
Claims priority, application Great Britain, Apr. 14, 1965, 16,050/65
Int. Cl. C07d 49/36
U.S. Cl. 260—309 2 Claims

ABSTRACT OF THE DISCLOSURE 2-aminoimidazole and its alkyl, benzyl and aryl ring-substituted derivatives are prepared by reacting cyanamide with α-(primary and secondary) amino-ketones and α-secondary amino aldehydes. The products are useful as intermediates for the preparation of the known antibiotic azomycin and known and also new homologues and analogues thereof.

---

This invention is concerned with a new chemical process and to the novel products of such process. More particularly, the process forming the subject of this invention is concerned with the preparation of 2-aminoimidazoles of the formula

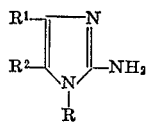

wherein R, $R^1$ and $R^2$ represent hydrogen or a lower alkyl, aryl or aralkyl group except that R and $R^1$ are not simultaneously hydrogen.

The compounds prepared according to the new process hereinafter described and claimed are useful intermediates for the preparation of the homologues and analogues of the known antibiotic azomycin, according to a procedure forming the subject of our application Ser. No. 470,888, filed July 9, 1965, now abandoned, namely, by diazotizing the alkyl derivatives of the 2-aminoimidazole with an about equimolecular amount of an alkali metal nitrite in concentrated fluoboric acid. The resulting mixture is then treated with an excess over an equimolecular amount of an alkali metal nitrite in water in the presence of copper powder as the catalyst. The obtained 2-nitroimidazoles display a high activity against *Trichomonas vaginalis*.

The process of the invention consists in contacting one mole of an α-amino carbonyl compound with at least three moles of cyanamide in water at pH between about 4 and 7 at a temperature between 70 and 100° C. according to the following reaction scheme:

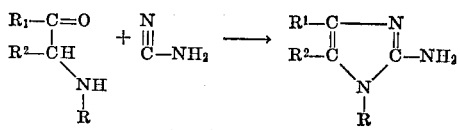

wherein R, $R^1$ and $R^2$ have the above significance.

Yields are usually very high, and the reaction is a very general one, contrary to all presently known syntheses of 2-aminoimidazoles, which are applicable only to individual instances and yield large amounts of side products. Our process represents therefore the first general method of preparing 2-aminoimidazoles in commercially acceptable yields and without the concomitant formation of side products requiring cumbersome isolation procedures.

If the starting compound is an amino-aldehyde, it can be prepared by reducing the ethyl ester of an α-amino acid (Akabory reduction), according to the following scheme:

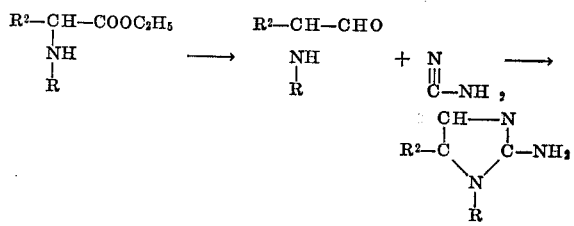

When the starting compound is a ketone, the pH of the reaction mixture has remarkable importance, especially in the case of aromatic aminoketones. Actually, it has to be limited between 4 and 5, because at strongly acidic, or alkaline pH values very different condensation products are formed.

The recovery of the products from the reaction mixtures can be achieved via mineral acid salts, and sometimes via picrate salt, from which a purified solution of the hydrochloride can be obtained by usual methods. The following nonlimitative examples illustrate the invention.

Example 1.—Preparation of 1-methyl-2-aminoimidazole

To a solution of 4.6 g. of sarcosine ethyl hydrochloride in 35 ml. of water 200 g. of 2.5% sodium amalgam were added over one hour, maintaining the pH acid by addition of 15% hydrochloric acid and keeping the temperature between —5° and 0° by addition of solid $CO_2$. The mixture was stirred at 0° for a further thirty minutes and then the mercury was separated. To the resulting solution of methylaminoacetaldehyde 3.5 g. of cyanamide were added. The pH was brought to 4.5, the solution heated for one hour on a steam bath and then evaporated to dryness under reduced pressure. The residue was washed with ethyl ether to remove the unreacted cyanamide, dissolved in a small volume of water and added to a boiling solution of picric acid in water. The picrate, obtained on cooling, weighed 2.2 g. after recrystallization from methanol and melted at 208–210° C.

The picrate was dissolved in a boiling mixture of 150 ml. of water, 10 ml. of concentrated HCl and 500 ml. of benzene. The organic phase was separated, the inorganic phase extracted several times with benzene and evaporated to dryness. Recrystalliaztion of the residue from ethanol-ethyl ether afforded 0.7 g. of 1-methyl-2-aminoimidazole hydrochloride, M.P. 84–85° C.

The free base cannot be isolated in pure form, being largely soluble in water and not stable.

Example 2.—Preparation of 1,5-dimethyl-2-aminoimidazole

A solution of α-N-methylaminopropionaldehyde was prepared by reducing 4 g. of ethyl α-methylaminopropionate as described in the preceding example. After addition of 3.5 g. of cyanamide the pH was brought to 4.5, the solution heated on a steam bath for 1 hour and evaporated to dryness. The residue was taken up in 100 ml. of anhydrous ethanol and the sodium chloride removed by filtration. The solution was concentrated to 20 ml. and made acid with 5 ml. of hydrogen chloride-saturated ethanol. On addition of ethyl ether a precipitate was obtained. Recrystallization from ethanol-ether yielded 2.5 g. of 1,5-dimethyl-2-aminoimidazole hydrochloride, M.P. 257° C. (dec.). The free base cannot be isolated in pure form, being largely soluble in water and not stable.

Example 3.—Preparation of 1-methyl-5-ethyl-2-aminoimidazole

The reaction was performed as described above for the dimethyl derivative. Starting from 8.8 g. of ethyl α-methylaminobutyrate 3.05 g. of pure 1-methyl-5-ethyl-2-aminoimidazole hydrochloride, M.P. 201–203° C. are obtained. The free base cannot be isolated in pure form, being not stable.

Example 4.—Preparation of 4,5-dimethyl-2-aminoimidazole

A solution of 7.3 g. of 1-aminoethyl methyl ketone hydrochloride and 7.5 g. of cyanamide in 120 ml. of water is adjusted to pH about 5 with sodium hydroxide and is then heated to 85–95° C. for 1 hour. After having distilled off the solvent the residue is extracted with diethyl ether to remove the excess cyanamide and the insoluble is treated with acetone. The precipitate is collected and recrystallized from ethanol. Yield 7 g. (80%) of 4,5-dimethyl-2-aminoimidazole hydrochloride, M.P. 289° C. From this, the free amine can be isolated by dissolving the hydrochloride in water, adding a strong alkali and extracting with ethyl ether.

Example 5.—Preparation of 4-methyl-2-aminoimidazole

A solution of 5 g. of aminoacetone hydrochloride and 5 g. of cyanamide in 30 ml. of water is adjusted to pH 6 with sodium hydroxide, then to pH 4.5 with acetic acid. The solution is heated to 85–95° C. for 45 minutes, then it is evaporated to dryness. The residual oil is extracted with diethyl ether, the insoluble is treated with water and made acidic by the addition of aqueous hydrochloric acid. On evaporation of the solvent an oil remains, which can be crystallized from a diethyl ether-ethanol mixture. Yield 5 g. (82%) 4-methyl-2-aminoimidazole hydrochloride, M.P. 115–117° C. From the hydrochloride the free base may be isolated by conventional procedures. The picrate has M.P. 186–187° C.

Example 6.—Preparation of 4-methyl-5-benzyl-2-aminoimidazole

A solution of 12 g. of α-aminophenethyl methyl ketone hydrochloride and 12 g. of cyanamide in 130 ml. of water is adjusted to pH about 5 and heated at about 90–95° C. for 90 minutes. After evaporation of the solvent in vacuo the residue is extracted with diethyl ether and the insoluble is treated with acetone. The collected precipitate is recrystallized from a diethyl ether-ethanol mixture. Yield 10 g. (75%) of 4-methyl-5-benzyl-2-aminoimidazole hydrochloride, M.P. 159–160° C. The free base is obtained as usual.

Example 7.—Preparation of 4-phenyl-2-aminoimidazole

The preparation is carried out exactly as described in the preceding examples, from 5 g. of α-aminoacetophenone hydrochloride, 5 g. of cyanamide and 30 ml. of water at pH 4.5 and heating for 90 minutes. Yield 3.5 g. (68%) of the hydrochloride, M.P. 207–209° C. The picrate melts at 227–228° C. The base crystallizes by adding alkalies to the aqueous solution of the hydrochloride.

Example 8.—Preparation of 4-methyl-5-phenyl-2-aminoimidazole

The preparation is carried out as described in the preceding examples from 7.4 g. of α-aminobenzyl methyl ketone hydrochloride, 7 g. of cyanamide, and 50 ml. of water. Yield 7 g. (86%) of the hydrochloride, M.P. 84–85° C. The picrate has M.P. 214–217° C. The free base can be obtained as usual.

Example 9.—Preparation of 1-methyl-4-phenyl-2-aminoimidazole

A solution of 8.7 g. of α-methylaminoacetophenone and 9 g. of cyanamide in 50 ml. of water is adjusted to pH 5 and treated at about 95° C. on a boiling water bath for 1.5 hours. The mixture is then worked up as described in the preceding examples. Yield 9 g. (61%) of the hydrochloride, M.P. 125–127° C. The picrate has M.P. 247–249° C. The free base is obtained as usual.

What we claim is:

1. A process for preparing a 2-amino-imidazole of general formula

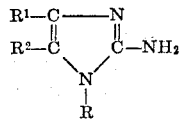

wherein R, $R^1$ and $R^2$ are selected from the class consisting of hydrogen, lower alkyl, benzyl and phenyl, except that R and $R^1$ are not simultaneously hydrogen, which comprises heating an α-amino carbonyl compound of the formula

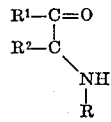

wherein R, $R^1$ and $R^2$ have the above significance, R and $R^1$ have the above limitation, with cyanamide, in an aqueous solvent, at a temperature of 70–100° C., for 0.5 to about 1.5 hours.

2. A process as claimed in claim 1, wherein the molar ratio between the selected α-amino carbonyl compound and cyanamide is about 1:3, and the pH of the reaction mixture is between about 4 and 7.

References Cited

FOREIGN PATENTS 38-24885  11/1963  Japan.

OTHER REFERENCES

Burtles et al., Jour. Chem. Soc. (London), vol. 127, pp. 2012–8 (1925), QDI.C6.

Lawson, Jour. Chem. Soc. (London) 1956, pp. 307–10, QDI.C6.

Nakanishi et al., Jour. Amer. Chem. Soc., vol. 76, pp. 2845–6 (1954), QDI.A5.

Pyl et al., Chem. Ber., vol. 94, pp. 3218 and 3223 (1961), QDI.D4.

Pyl et al., Liebig J. Ann. Chem., vol. 663, pp. 108–12 (1963), QDI.L7

HENRY R. JILES, *Primary Examiner.*

NATALIE TROUSOF, *Assistant Examiner.*

U.S. Cl. X.R.

260—570.5, 584, 999